May 21, 1929.  A. J. SCHMITT  1,714,142

GASKET AND SEAT THEREFOR

Filed July 12, 1928

Inventor:
Arthur J. Schmitt
By Casper L. Redfield
Atty.

Patented May 21, 1929.

1,714,142

UNITED STATES PATENT OFFICE.

ARTHUR J. SCHMITT, OF CHICAGO, ILLINOIS.

GASKET AND SEAT THEREFOR.

Application filed July 12, 1928. Serial No. 292,157.

My invention relates to gaskets and seats therefor, and more particularly to those gaskets used in train pipe couplings. The gasket and seat of the present invention are connected together so as to form a unit for insertion into and removal from a coupler head, the connecting device between seat and gasket being so constructed as to permit one to have a limited oscillatory movement on the other.

In the present invention I preferably make the bodies of both seat and gasket of some member of the phenol-resin group, and then provide metal liners for both seat and gasket. These metal liners furnish the connecting points by which the liner and gasket are connected together, and in the seat the liner furnishes a groove for holding the expansion ring which secures the seat within a coupler head of a common and well known type. Also, the liner of the body of the seat is so formed that it itself furnishes the seating surface for the gasket, but the liners of the gasket and the seat preferably do not come in contact with each other.

In the accompanying drawings

Figure 1:
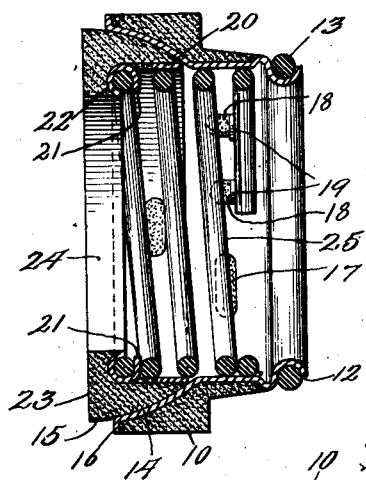
Fig. 1 is a longitudinal section, at somewhat more than full size, of a unit adapted to fit into a standard form of coupler head.
Figure 3:
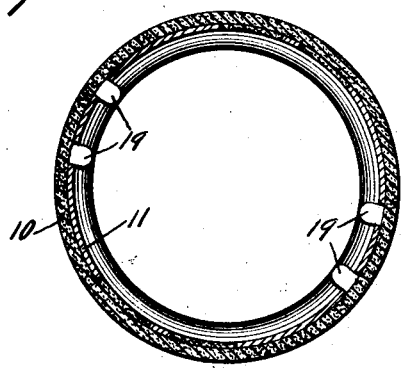
Fig. 3 is a section on line 3—3 of Fig. 2.
Figure 2:
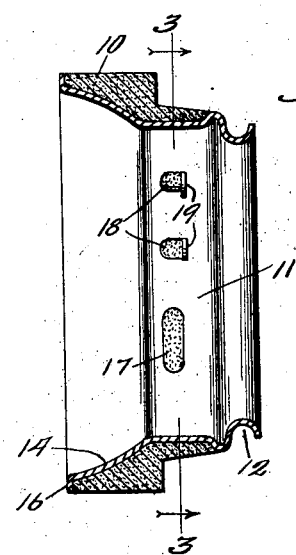
Fig. 2 is a similar section of the seat separated from the other parts.
Figure 4:
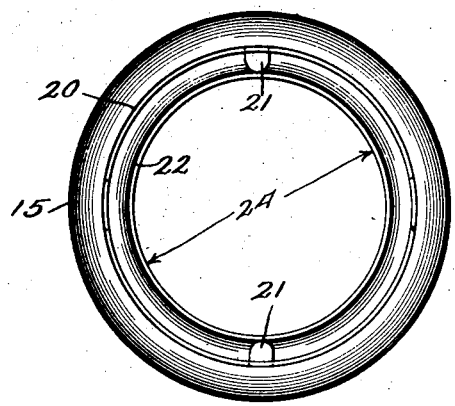
Fig. 4 is a view of the inner face of the gasket separated from other parts.

In the said drawings, 10 is the body of a gasket seat, said body having an exterior shape adapting it to fit into a standard coupler head. Inside of the body 10 is a metallic liner 11, one end of which terminates in a circumferential groove 12 adapted to receive an attaching spring 13. The construction of parts 12 and 13 are well known and require no special description.

At the other end, the liner 11 provides a cup 14 arranged to receive and support the actual seating face of the gasket 15. At the extreme end, the liner is turned over as shown at 16 to protect the thin edge of the body 10, and also to act as a re-inforcing flange. As so constructed, the material of the body 10 may be thin, and the channel thru the liner may be of comaparatively large diameter. Large openings thru coupling devices are desirable, especially when train pipes are long.

In the wall of the liner 10 are cut one or more openings 17 and other openings 18. The metal from these last openings is bent up to form attaching lips 19. The liner 11 is formed first by the use of suitable dies, and the body 10 is molded upon its exterior surface. In this proceeding, the material of the body enters the openings 17 and 18 and serves to bind the body and the liner securely together.

In a similar manner, the body of the gasket is molded upon the liner 20, in which liner are similar openings for binding body and liner together. Metal from part of these openings is turned up to form attaching lips 21. The extreme inner end of the liner 20 is turned inward at 22 to form an inside groove corresponding in a general way to the outside groove 12. When the gasket body 15 is molded upon the liner 20, the outer face 23 is made flat to co-operate with the flat face of a like gasket held in a like seat. The opening 24 is made as large as possible, consistent with the width of the face 23 for giving a tight joint between two gaskets.

Between the opening 24 and the opening at the far end of the liner 11, the unit is of larger diameter, and in this recess or enlarged diameter is a helical spring 25 which acts to hold the parts of the unit together with the convex face of the gasket in intimate contact with the concave face of the seat. One end of spring 25 is connected to the attaching lips 19, and the other end is connected to the attaching lips 21. This spring is under initial tension, the degree of which may be determined by turning the gasket as a screw upon the seat.

It is to be observed that the gasket and its seat taken together form a channel, the diameter of which channel is not affected by the fact that the gasket is movable upon its seat. Also, that the spring which holds the two parts together so that they form a unit, permits a limited universal movement of the gasket upon the seat without obstructing that channel. To permit this universal movement of one with respect to the other, the convex surface of the gasket and the concave surface 14 form a ball and socket joint.

What I claim is:

1. In a device of the class described, a seat member consisting of a body molded upon a liner which provides attaching means at one end and a cup at the other end, a gasket member molded upon a second liner and having an exterior surface fitting into said cup, and a spring having one end secured to one liner and the other end secured to the other liner, said spring serving to hold the parts together so that they form a self-contained unit.

2. In a device of the class described, a seat member consisting of a body molded upon a metallic liner providing a cup at one end, a gasket member molded upon a second liner and having a convex exterior fitting into said cup, the seat and gasket members together providing a channel the interior parts of which are of larger diameter than the terminals of the channel, and a helical spring located in the enlarged part of said channel and having its ends secured respectively to the seat and the gasket.

3. In a device of the class described, a seat member consisting of a body molded upon a metallic liner providing a flanged cup at one end, the liner having openings punched therein to provide binding between the body and liner and also to provide attaching lips, a gasket member molded upon a second liner having similar openings and lips and the exterior of the gasket member being convex to fit said cup, and a helical spring having one end connected to a lip in one liner and the other end connected to a lip in the other liner.

4. In a device of the class described, an annular body having its exterior shaped to fit the interior of a standard coupler and its interior lined with a metallic tube furnishing a receiving cup at one end, a second annular body having its exterior shaped to fit in said cup and a portion of its interior lined with a second metallic tube, and a spring securing the two bodies together while permitting the second body to have a universal oscillatory movement of limited extent within said cup.

ARTHUR J. SCHMITT.